United States Patent [19]

Lohman et al.

[11] Patent Number: 5,301,317
[45] Date of Patent: Apr. 5, 1994

[54] SYSTEM FOR ADAPTING QUERY OPTIMIZATION EFFORT TO EXPECTED EXECUTION TIME

[75] Inventors: Guy M. Lohman, San Jose, Calif.; Kiyoshi Ono, Yokohama, Japan; John D. Palmer, San Jose, Calif.

[73] Assignee: International Business Machines Corporation, Armonk, N.Y.

[21] Appl. No.: 874,170

[22] Filed: Apr. 27, 1992

[51] Int. Cl.$^5$ .............................................. G06F 15/40
[52] U.S. Cl. ................................. 395/600; 364/282.1; 364/DIG. 1; 395/650
[58] Field of Search ................. 395/600, 650, 800, 700

[56] References Cited

U.S. PATENT DOCUMENTS

| | | | |
|---|---|---|---|
| 4,531,186 | 7/1985 | Knapman | 395/600 |
| 4,769,772 | 9/1988 | Dwyer | 395/600 |
| 4,829,427 | 5/1989 | Green | 395/600 |
| 4,956,774 | 9/1990 | Shibamiya | 395/600 |
| 5,043,872 | 8/1991 | Cheng | 395/600 |
| 5,091,852 | 2/1992 | Tsuchida | 395/600 |

OTHER PUBLICATIONS

An Introduction to Database Systems; CJ Date; vol. 1 4th Ed.; Addison-Wesley Publishing Co. 1986; pp. 333-359.
Extensible Enumeration of Feasible Jons for Relational Query Optimization; IBM 1988; by K. Ono et al.
Measuring the Complexity of Join Enumeration in Query Optimization by K. Ono et al; IBM 1990; pp. 314-325.
Access Path Selection in Relational Database Systems by M. S. Lakshmi et al; IBM; vol. 30, No. 9; pp. 420-421.
Relational Assignments for Distributed Database Systems by D. Cornell et al; IBM; vol. 31, No. 1; pp. 219-225.
Extended Disjunctive Normal Form for Efficient Processing of Recursive Logic Queries by S. Brady et al; IBM 1987; pp. 360-366.
Distributions of Query Plan Costs for Large Join Queries by A. Swami: IBM 1991; pp. 1-17.
Bayesian Stopping Rules for Multi-Start Global Optimization Methods by C. G. E. Boender; IBM 1987; vol. 37, pp. 59-80.
Optimization of Large Join Queries by A. Swami et al; IBM 1987; ACM-Sigmond Int'l Conf. on the Mgmt. of Data; pp. 8-17.

*Primary Examiner*—Paul V. Kulik
*Assistant Examiner*—Jennifer M. Orzech
*Attorney, Agent, or Firm*—Baker, Maxham, Jester & Meador

[57] ABSTRACT

A system for the automatic adjustment of resources devoted to query optimization according to estimated query execution time. The disclosed system permits the query optimizer to automatically trade off the time spent estimating the execution cost of alternate query execution plans against the potential savings in execution time that one of those alternate plans may yield. The number of alternate plans considered is adjusted by selecting compile-time parameters and heuristic criteria for limiting the primitive database operators used in the alternate plans, thereby establishing a new search space. The parameters and criteria are adjusted according to the estimate of execution cost for the optimal plan from a first search space. The first search space may be relatively small and quickly evaluated. Evaluation of larger subsequent search spaces is optional according to an automatic thresholding process of the disclosed system.

7 Claims, 6 Drawing Sheets

Find a plan P having minimal cost C in the initial search space I=0.
FOR EACH i in S, WHILE ( A*N(i) < (1 - T)*C),
  Explore search space i to find a plan P(i) having minimal cost C(i).
  IF C(i) < C, set C = C(i) and P = P(i).
RETURN P AND C.

SYSTEM FOR ADAPTING QUERY OPTIMIZATION EFFORT TO EXPECTED EXECUTION TIME

BACKGROUND OF THE INVENTION

1. Field of the Invention

This invention relates to automatic query optimization methods in database systems and, more specifically, to a system for adjusting the resources devoted to query optimization responsive to estimated query execution time.

2. Description of the Related Art

Query optimizers operate in relational database management systems to translate queries posed in a non-procedural language such as SQL into an efficiently executable plan. Reference is made to C. J. Date, *An Introduction to Database Systems*, Vol. 1, Fourth Edition, "Chapter 16: Query Optimization", p. 335, Addison-Wesley Publishing Co., Reading, Mass. (1986), for an overview of the optimization process. According to Date, the overall optimization process can be viewed as four broad stages. These are (1) casting the user query into some internal representation, (2) converting to canonical form, (3) choosing prospective implementation procedures, and (4) generating executable plans and choosing the cheapest of such plans.

The desired query execution plan consists of an ordered series of primitive database operators and is typically developed by choosing the plan having the least estimated execution cost from among several alternative plans making up a "search space". A search space embraces a number of query execution plans that are limited according to the type and sequence of the primitive database operators allowed in the plans. Since only two-way join operators are usually provided as primitives, an optimizer is normally obliged to select the "best" sequence of two-way joins to achieve the N-way join of data tables requested by a non-procedural user query.

Thus, the computational complexity of the optimization process and the execution efficiency of the plan chosen by that process are dominated by the number of such possible primitive operator sequences that must be evaluated by the optimizer. That is, they are dominated by the size of the "search space" spanned by the query optimizer. An exhaustive enumeration is clearly exponential in the number of tables and hence is impractical for all but trivial queries. Thus, some scheme for limiting the search space must be provided to any query optimizer.

The typical query optimizer, for efficiency during optimization, limits the query space of join sequences to be evaluated by (1) using a form of dynamic programming to eliminate sub-plans whose estimated cost is greater than other sub-plans producing equivalent results, (2) restricting the "inner" operand of each join to be a single table, and (3) requiring each join to have at least one equi-join predicate of the form (column1=column2), where (column1) must be in one operand of the join and (column2) is in the other join operand. The restrictive form of this third limitation implies that predicates involving inequality, arithmetic or type conversion or more than two tables do not satisfy the criteria for a "feasible" join sequence and are excluded from the limited search space.

It is easily proven that dynamic programming never eliminates a potentially better plan but the second and third limitations mentioned above are heuristics that may exclude a superior plan without notice under some circumstances. Each query plan is built by combining a set of candidate implementation procedures, one such procedure for each of the primitive database operations in the query. There are normally many feasible plans for any given query and it is often not reasonable to generate all possible plans because of the expense of doing so. The process of establishing primitive database operator selection criteria to reduce the number of query execution plans to be evaluated can viewed as "reducing the search space". Accordingly, a "search space" herein denotes a set of executable query plans that are selected on the basis of some formal or heuristic criteria related to primitive database operators.

When a given query is to be executed repeatedly, additional optimization efforts such as considering more join sequences over a larger search space can be justified by the resulting improvement in execution costs leveraged over multiple query executions. On the other hand, response time for interactive ad hoc queries includes both optimization and execution costs. Thus, heuristics that severely limit the optimizer's search space are usually beneficial for interactive systems. Also, certain knowledge peculiar to an application may generate special heuristics for excluding plans that are dominated in that application but not in others. Thus, there is a clearly felt need for greater flexibility in selecting feasible join sequences over the fixed join selection criteria in query optimizers known in the art.

Practitioners in the art have responded to this need by proposing new methods for improving query optimizer efficiency. Reference is made to K. Ono et al, "Extensible Enumeration of Feasible Joins for Relational Query Optimization", IBM Research Report, RJ 6625 (63936) Dec. 28, 1988, IBM Almaden Research Center, San Jose, Calif., for disclosure of a query optimizer that allows simple adjustment of the number of alternative join sequences that are automatically generated, including a new criterion that requires an explicit or implied join predicate for any join, where such join predicate can be any predicate relating more than one table.

Essentially, Ono et al teach a method for quickly and effectively adjusting the size of the search space by changing the primitive database operator selection criteria. Their extensible join enumeration algorithm enumerates a wider variety of feasible two-way joins than other methods previously known in the art because it exploits predicates that (a) reference more than two tables, (b) involve arithmetic or conversion operators, or (c) are implied by other predicates. Also, the Ono et al method can parametrically adjust the space of join sequences evaluated by the optimizer to allow or disallow (1) composite tables as the inner operand of a join or (2) joins between two tables having no join predicate linking them, such as Cartesian products. Both Cartesian products and composite tables that are themselves a result of a join are usually excluded by query optimizer systems to limit the search space size. The blanket exclusion of these two database operations functions as an inflexible limit on query optimizer flexibility and efficiency.

Reference is also made to Ono et al, "Measuring the Complexity of Join Enumeration in Query Optimization", Proceedings of the 16th VLDB Conference, Brusbane, Australia (1990), pp. 314–325. Ono et al conclude that enumeration of the join sequences for a query is the dominant factor in both the query optimization costs and the quality of the resulting execution plans. Their join enumeration procedure generates better execution plans by enlarging the set of feasible plans to include composite inners and Cartesian products at any place in the join sequences. This allows the search space to be adjusted by making incremental changes to the join sequence selection criteria. However, Ono et al do not consider the problem of automatically varying the search space and do not teach how to ensure global query optimization.

Other practitioners have applied global optimization strategies to the problem of optimization of large join queries. The global optimization problem can generally be considered to be a problem of locating the global optimum in a large space having many local optima. The usual solution is to search through the space while indexing across several of the local optima until such time as the search "should" be terminated according to some criteria. Reference is made to, for instance, Boender, et al, "Bayesien Stopping Rules for Multi-Start Global Optimization Methods", *Mathematical Programming*, Vol. 37, pp. 59–80, (1987), for a discussion of the art of solving the unconstrained global optimization problem. Reference is also made to A. Swami, et al, "Optimization of Large Join Queries", *Proceedings of ACM-SIGMOD International Conference on Management of Data*, pp 8–17, June 1988, for a discussion of their application of global optimization techniques to the query optimizer problem Swami et al express the query optimizer problem as an optimal join order problem by using several commonly known heuristics for limiting search space size. They first severely limit the size of their search space and then perform global optimization according to simple iterative improvement and simulated annealing methods. They neither teach nor suggest means for dynamically varying the search space in response to estimated query cost and their method does not guarantee that the universally optimum query plan even exists in their limited search space.

A similar approach is suggested by Xerox Advanced Information Technology researchers in an unpublished memorandum. This Pilot Pass approach uses an initial "pilot" phase of optimization over a limited search space to determine an estimated execution time. The set of alternatives is limited in this first pass by setting an upper bound on the longest constituent operation time in any evaluated plan rather than excluding entire classes of plans to limit the search space. If this longest constituent operation time exceeds the estimated execution time for the optimum plan, then no plan that is excluded by the pilot phase can possibly run in less that the estimated execution time so the plan found in the pilot phase is clearly optimal. Otherwise, a second phase of optimization then considers the entire set of alternative plans by setting the longest constituent operation time threshold to infinity and then pruning any plan whose execution time estimate exceeds the initial pilot pass estimate of query execution time. This Pilot Pass approach does not consider adjusting the size of the search space but rather defines a filter that summarily eliminates a plan from consideration as soon as one of its constituent operations is found to exceed an arbitrary execution time threshold. This approach neither considers nor suggests a method for trading off optimization time automatically in response to prospects for improved execution time because the second "unlimited" search space evaluation is always executed if the longest constituent plan operation time is less than the pilot pass estimate of execution time, even if the estimate for execution time is smaller than the time required to evaluate the "unlimited" search space.

In U.S. Pat. No. 4,769,772, P. A. Dwyer discloses an automated query optimization method using both global and local optimization for distributed databases. Dwyer chooses to optimize locally if such is more efficient than optimizing over the distributed system. She neither suggests nor considers adjusting the size of the search space and uses a fixed set of criteria to establish the local and distributed search spaces without providing any estimation of optimization costs.

In U.S. Pat. No. 4,531,186, J. M. Knapman discloses a user-friendly database access method for writing user queries for a special type of database system. Knapman does not consider the problem of query optimization for large databases, generally limiting his teachings to evaluation and selection of database access paths by constructing a data directory and accordingly choosing application programs and program communication blocks.

In U.S. Pat. No. 4,829,427, N. L. Green discloses a database query code generation and optimization technique responsive to the cost of alternative access methods. Green also does not consider the problem of optimizing query execution plans but limits her teachings to methods for choosing data access paths after a query execution plan is already established. Green neither considers nor suggests methods for adjusting query execution plan efficiency according to the interaction between query plan and data access path.

Reference is made M. S. Lakshmi, et al, "Access Path Selection in Relational Database Systems", IBM Technical Disclosure Bulletin, Vol. 30, No. 9, February 1988, pp. 420–421, for another discussion of data access path optimization limited in application to single variable relational queries in database management systems. Again, Lakshmi et al do not consider the problem of query execution plan optimization but teach instead one of many useful methods for quickly defining an elementary search space.

Reference is made to D. Cornell, et al, "Relational Assignments for Distributed Database Systems", IBM Technical Disclosure Bulletin, Vol. 31, No. 1, June 1988, pp. 219–225, for discussion of a technique for parsing distributed database queries into communication and relational steps for optimization with respect to inter-node communication requirements. Cornell et al propose procedures for decomposing queries into simple relational steps expanded with potential message steps to equalize the work load across multiple systems and are primarily concerned with load sharing rather than query optimization.

Reference is made to S. Brady, et al, "Extended Disjunctive Normal Form for Efficient Processing of Recursive Logic Queries", IBM Technical Disclosure Bulletin, Vol. 30, No. 1, June 1987, pp. 360–366, for a discussion of a procedure that eliminates unnecessary temporary tables during optimization of the type of formal query procedure used in expert system. The Brady et al technique is useful for optimizing queries within a single search space but nether suggests nor considers methods for adjusting the search space responsive to query execution time.

Increasing the set of feasible plans to form a larger search space may improve the chance of locating the universal optimum but does not guarantee it. Unfortunately, increasing a search space size does guarantee an increase in the query evaluation and optimization costs. A major challenge in the design of query optimizer to ensure that the space of feasible plans contains efficient plans without making it too big to be generated practically. The techniques in the art for query optimization do not provide means for automatically adjusting the search space in response to query execution time and do not suggest practical means for guaranteeing inclusion of the universal optimum.

These unresolved problems and deficiencies are clearly felt in the art and are solved by this invention in the manner described below.

SUMMARY OF THE INVENTION

It is an object of this invention to automatically ensure that the optimizer search space embraces the more efficient query execution plans without being so large that it is impractical to generate and search the entire space.

This invention permits the query optimizer to make an automatic trade-off during optimization based on the estimated cost of the least costly (best) plan identified thus far. This capitalizes on a method for adjusting the number of alternatives in the search space by modification of compile-time parameters. This adjustment can be accomplished in any suitable manner such as through the modification procedure for the IBM Starburst query optimizer discussed in the Ono et al references cited above. These compile-time parameters serve to limit and adjust the search space of alternatives considered by enabling or disabling certain classes of alternative plans that less frequently include the optimal plan for query execution.

The method of this invention performs query optimization in two phases. A first phase of query optimization selects the least costly from among a small space of alternative plans defined by disabling all "optional" classes of plan alternatives. This first "optimum" execution plan is then evaluated to obtain an initial estimate of query execution time, completing the first phase.

The second phase evaluates a larger search space of alternative plans by first estimating the number of plans in the larger space and then testing an arbitrary one of them to measure the evaluation time for a single plan in the larger space. The product of the estimated number plans and the single plan evaluation time quickly yields a rough estimate of the evaluation cost for the entire larger search space. The larger search space is then evaluated (searched) only if the initial estimated query execution cost exceeds the estimated space evaluation time by some threshold. A larger estimated execution cost for the first "optimum" plan automatically results in selection of a larger second search space through the automated adjustment of compile-time parameters.

It is an object of this invention to solve the problem of automatic variation of optimization effort in response to changes in estimated query execution cost. It is a feature of this invention that such automatic adjustment of query optimization effort can be accomplished by evaluating a series of graduated search spaces until estimated improvement fails to exceed estimated search space evaluation cost. It is another feature of this invention that the automatic variation may also be accomplished by adjusting the compile-time parameters to control the size of the search spaces evaluated in response to the estimated savings in execution cost.

The foregoing, together with other objects, features and advantages of this invention will become more apparent when referring to the following specification, claims and the accompanying drawing.

BRIEF DESCRIPTION OF THE DRAWING

For a more complete understanding of this invention, reference is now made to the following detailed description of the embodiments as shown in the accompanying drawing, wherein.

DETAILED DESCRIPTION OF THE PREFERRED EMBODIMENTS

The method of this invention includes steps for adjusting search space size by varying primitive database operator selection and sequence criteria. Any suitable method for varying search space size can be used with the method of this invention but the extensible enumeration technique of the Ono et al reference cited above is preferred.

Search Space Adjustment by Extensible Enumeration

Although published in the Ono et al references cited above, the extensible enumeration technique is summarized herein to illustrate the preferred method for adjusting a search space. The extensible enumeration algorithm can enumerate a wide range of join sequences. It exploits implied predicates and predicates referring to more than two tables as join predicates, places no limit on the number of tables in a query and facilitates changes to its feasible join criteria. This last feature is of fundamental importance to the method of this invention because the set of feasible join criteria, which specify what tables may be joined, is the primary means for controlling search space characteristics.

Although an expanded search space may generate more cost-efficient plans for some queries, the capability to adjust feasible join criteria to specific applications is a necessary means for controlling the numbers of plans in the search space. With an adaptable search space, the feasibility criteria (primitive database operator selection and sequence criteria) can be adjusted for the particular queries at hand. If the queries are complex, these criteria may be made more restrictive to reduce the number of feasible plans so that the evaluation cost is more reasonable. For instance, composite inners may be disallowed to reduce the number of feasible joins and, consequently, the number of feasible plans.

Figures 1, 7:
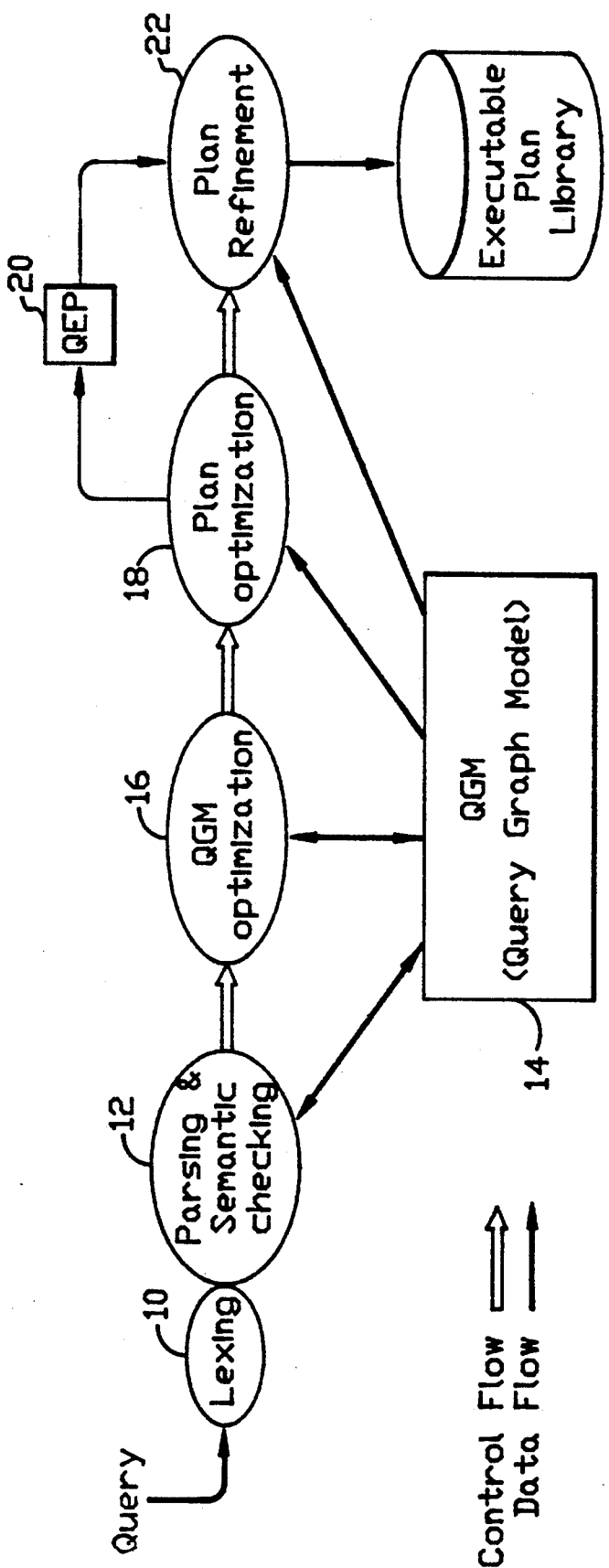
FIG. 1 shows a schematic representation of the query translation process used in the IBM Starburst system.
FIG. 7 provides a PASCAL-type pseudocode embodiment of the method of this invention.

FIG. 1 discloses the query translation process in the Starburst relational database management system (L.

M. Haas, et al, "An Extensible Processor for an Extended Relational Query Language", IBM Research Report, RJ 6182, IBM Almaden Research Center, San Jose, Calif., April 1988). Queries written in the SQL language are processed in phases as illustrated in FIG. 1. A query is first lexed at 10, parsed and checked semantically at 12, and converted into an internal representation denoted the Query Graph Model (QGM) 14, which is a common data structure that summarizes the semantic relationships of the query and is used by all components of the query translator. A QGM optimization procedure 16 then rewrites the query in canonical form at the QGM level by iteratively transforming one QGM 14 into another semantically equivalent QGM 14 (W. Hasan, et al, "Query Rewrite Optimization in Starburst, IBM Research Report, RJ 6367, IBM Almaden Research Center, San Jose, Calif., August 1988).

The purpose of QGM optimization procedure 16 is to simplify QGM 14 and help the subsequent plan optimization process to produce improved Query Execution Plans (QEPs). A plan optimization procedure 18 generates alternative QEPs, and chooses the best QEP 20, based on estimated costs. The plan refinement procedure 22 transforms best QEP 20 further by adding information necessary at execution time to make QEP 20 suitable for efficient execution.

The method of this invention is an improvement to plan optimization procedure 18 illustrated in FIG. 1. For an understanding of QGM 14 characteristics, reference is made to the above Ono et al references. Among other characteristics, QGM 14 embraces the three concepts of (a) quantifiers or tuple variables, (b) predicates, and (c) SELECT or RETRIEVE operations Plan optimizer 18 twice reviews the optimized QGM generated in response to a query to generate QEP 20. In the first pass, some data structures are initialized with QGM information. In the second pass, optimizer 18 uses a rule-based plan refinement procedure 22 to construct plans for each QGM operation, starting with plans for accessing individual tables and combining sub-plans for parts of the operation (M. K. Lee, et al, "Implementing an Interpreter for Functional Rules in a Query Optimizer", Proceedings of the 14th VLDB, Long Beach, August 1988, pp. 218-229; and G. M. Lohman, "Grammar-Like Functional Rules for Representing Query Optimization Alternatives", Proceedings of the ACM-SIGMOD, June 1988).

Figure 2:
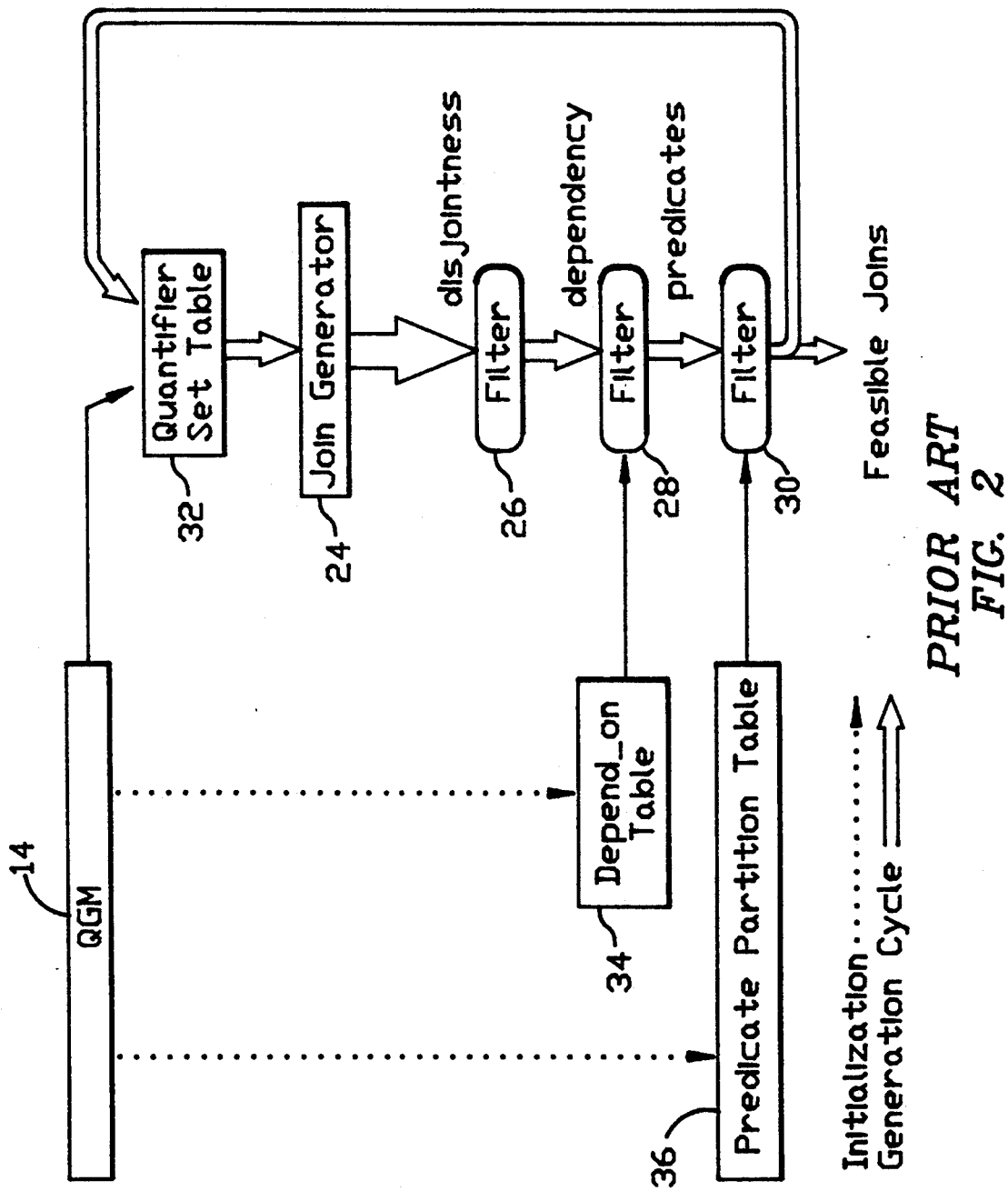
FIG. 2 shows the structure of the Starburst join enumerator process.

The Starburst feasible join enumerator was implemented by using a simple join generator to quickly create a super set of feasible joins and then filtering out non-feasible joins with a series of join feasibility tests. This generate and filter strategy is illustrated in FIG. 2. This approach is flexible and sufficiently adaptable to efficiently create a wide range of joins, including those containing composite inners, Cartesian products, implied predicates and predicates on more than two tables. An alternative join generator (not shown) may be added to this extensible design to improve efficiency for certain type of queries.

As mentioned above, an analysis of QGM 14 initially establishes some data structures for use by the join generator 24 and the filters 26, 28 and 30. Three data structures are used to efficiently enumerate a wide range of feasible joins as shown in FIG. 2. The quantifier set table 32 records feasible quantifier sets. The depend_on table 34 associates a quantifier with a set of quantifiers upon which the quantifier depends. The predicate partition table 36 facilitates testing the eligibility of (a) predicates on more than two tables and (b) implied predicates. Reference is made to the Ono et al reference first cited above for a discussion of implied predicates.

A quantifier set table 32 records the feasible quantifier sets that are produced as a result of feasible joins. Accesses to table 32 are of two kinds. One is to locate or insert the entry for a specific quantifier set when the quantifier set arises from a feasible join. The other is to find all quantifier sets of a given size for the join generator. Table 32 is initialized with quantifier sets of a single quantifier and new quantifiers sets are inserted as they are generated. An entry for a quantifier set in table 32 has two fields, "depend_on" and "refer_to".

The depend_on table 34 associates a first quantifier with a set of quantifiers upon which the first quantifier depends. Table 34 is initialized during the first pass of plan optimization mentioned above.

A predicate partition table 36 specifies how each predicate can be used in joins but includes join methods that may not work for a particular partition. A predicate entry in predicate partition table 36 consists of the set of quantifiers referenced in the predicate and a linked list of quantifier set partitions with possible join methods for joining each partition. If there are implied predicates, their partitions are also appended to the linked list of the partitions of the predicates from which the implied predicates come. The analyses that produce these partitions are accomplished during the first pass over QGM 14 to avoid repeated analysis of the parse tree for each predicate.

Join generator 24 creates progressively larger quantifier sets, starting from sets containing only one quantifier. This process is analogous to mathematical induction. Among the potential joins considered, only those sets whose joins satisfies the feasibility criteria are stored in quantifier set table 32 as a set of quantifiers. The Starburst join generator procedure is set forth in the Ono et al references cited above.

The join feasibility criteria may be (a) mandatory, universally valid criteria, or (b) heuristics for eliminating joins that are unlikely to contribute to the best plan for the entire query. The first criterion of disjointness (FIG. 2) is mandatory and requires that two quantifier sets be disjoint. Filter 26 makes this test and passes only those joins that meet the disjointness criterion. Note that this criterion does not exclude joins of a table with itself because two accesses to the table are represented as two different quantifiers.

The second criterion of dependency is also mandatory and requires that no quantifiers in the *outer* operand of a join depend on any quantifiers in the *inner* operand. Filter 28 makes this test and passes only those joins that meet the dependency criterion. If neither of two given quantifier sets can be the outer, the two sets cannot form a feasible join. A naive method to confirm this criterion is to check, for each quantifier in the outer, that the depend_on set of the quantifier does not intersect with the inner's quantifier set, which requires set intersection operations for each quantifier in the outer. To avoid repeated set intersection operations, the depend_on set of a quantifier set can be stored in table 32 so that the test is simplified to a disjointness test between the depend_on set of one quantifier set and the other quantifier set.

The depend_on relation further restricts feasible joins by making some seemingly-feasible joins unusable later in join sequences. This is the useless join elimination process. For instance, suppose q1 depends on q2, which depends on q3. It is permitted to join q1 and q3 if q3 is outer. However, {q1 q3} is a "useless join" that cannot be used in any plan for the entire query because there is no way to combine it with {q2}. Note that {q1 q3} must be outer to q2 because it contains q3 and, at the same time, it must be inner because it contains q1. This conflict occurs when there are some quantifiers upon which the inner depends and which themselves depend upon some quantifiers in the outer.

Testing for the existence of join predicates is a useful heuristic that is used to avoid Cartesian products, and is used in Starburst as a default condition that may be changed to any other criterion. The condition requires that there be at least one join predicate that connects two quantifiers sets to be joined. Join predicates are those predicates that can be evaluated during or after joins of two quantifier sets and that refer to some quantifier in both of the two quantifier sets. Filter 30 performs this heuristic test and passes only those joins that meet the default heuristic. To increase the efficiency of the search for join predicates, each quantifier set is associated with a set of predicates, denominated "refer_to", which is the set of predicates referring to some quantifiers in the set. With refer_to sets for quantifier sets qs1 and qs2, the search for feasible join predicates can be restricted to the inner section of the two refer_to sets. As with "depend_on", the refer_to set for a quantifier set is computed once during the first pass and stored in quantifier set table 32.

The order in which the above filtering criteria are tested has an important effect on performance. In Starburst, the criteria are tested in the order shown in FIG. 2 with filter 26 being first and followed by filter 28 and finally filter 30. This is because the "useless join" test for predicates tends to consume more time than the other filtering tests and is applied the least frequently if placed as the last test in the sequence of tests.

The Starburst system incorporates two classes of search space adjustment procedures. These are (a) parameterized control of the number of feasible joins and (b) replacing part of the join enumeration algorithm. First, the number of feasible joins can be controlled with two parameters in the generation and filtering processes. These parameters are composite inners and Cartesian products.

Enumeration of composite inners can be controlled with a parameter in join generator 24 (FIG. 1). This parameter specifies the maximum size of the smaller quantifier set in each join. If the parameter is set to unity, enumeration of composite inners is disabled in the sense that the join enumerator will enumerate pairs of quantifiers sets, one of which always have a single quantifier. By setting the parameter to some integer, composite inners can be enumerated having a size less than or equal to that integer. Cartesian products can be enabled or disabled by means of a second parameter in join generator 24.

The methods available for replacing parts of the join enumeration algorithm include (a) replacing the join generator, (b) replacing the join predicate filter and (c) replacing the entire enumeration algorithm. Join generator 24 (FIG. 2) is a general-purpose generator and can be replaced with any suitable special-purpose generator for a particular set of feasible join criteria and queries. For instance, with the default join criterion, which requires at least one join predicate for each join, and requires all quantifiers in a given query to be connected by predicate, a new generation method with a modified quantifier set table 32 can be used to avoid generating pairs of quantifier sets that do not have join predicates between them. In the resultant modified quantifier set table 32, quantifier sets are first grouped by the number of quantifiers, as before, and then by predicates that can join the quantifier sets with some other sets. In this way, when trying to join two sets of quantifiers, set pairs are restricted to those sharing a common predicate. This generation method is herein denoted the "alternative generation" procedure and has been implemented in Starburst to reduce the time required to enumerate feasible joins for certain queries.

Filter 30 (FIG. 2), which requires at least one join predicate, is merely a Boolean function and may be simply changed by inserting another Boolean function that decides whether it is advantageous to join two quantifier sets. For instance, new functions could examine the estimated number of tuples for the two sets and decide to join the sets if the estimated number of tuples is small enough even though there are no join predicates between the sets.

The entire enumeration method can be replaced as a whole without affecting the remainder of the plan optimizer illustrated in FIG. 2. Such a replacement could be used, for instance, to implement special heuristic methods for handling very large queries.

The Starburst join enumerator illustrated in FIG. 2 thus parameterizes the search space of alternative join sequences considered by the optimizer for any given query. Thus, the level of optimization effort can be tailored individually to the query. The method of this invention is a specific and unexpectedly beneficial automatic method for adapting the search space to a query.

The Measured Effects of Search Space Adjustment

The Ono et al references cited above describe experimental results of manual search space modification responsive to query geometry. The capability to parameterize the search space according to feasibility criteria permitted Ono et al to measure the effect of search space modification on optimization complexity and on the resulting execution time of the optimum query plan. The experimental results demonstrated that the complexity of optimizing a query is largely dependent upon a query parameter herein denominated "the shape of the query graph".

Figure 3:
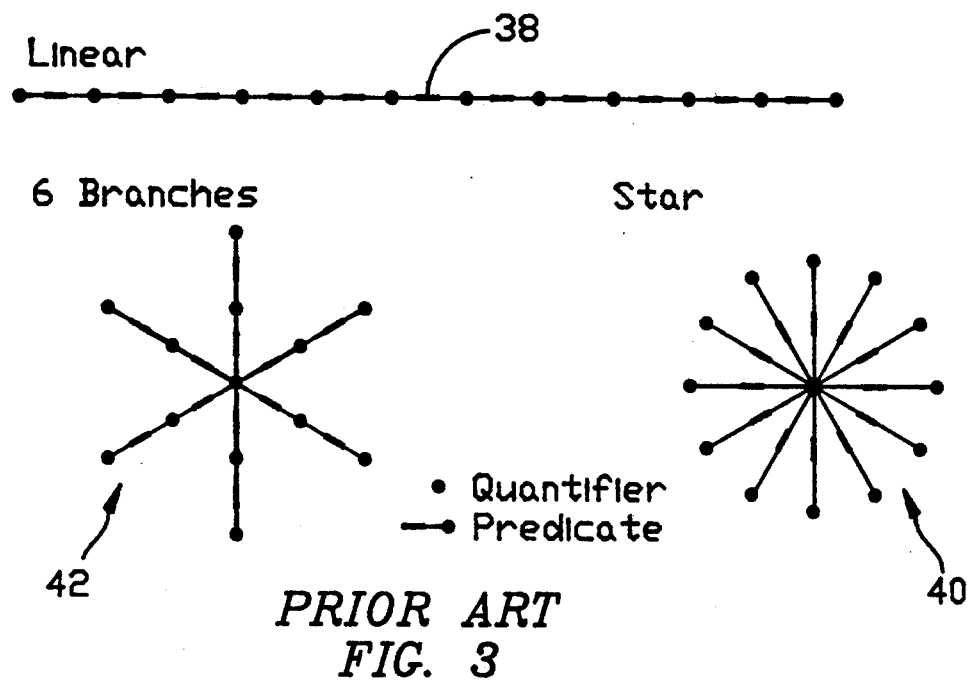
FIG. 3 shows examples of query graphical shapes.

A query graph shape is illustrated in FIG. 3 for three different query types. The graph shape indicates the number of referenced tables and how they are connected with predicates. It was unexpectedly discovered that the number of feasible joins does not necessarily increase exponentially with the number of tables for certain common queries. For example, for linear queries exemplified by the linear query 38 in FIG. 3, tables are connected by binary predicates in a straight line. The number of feasible joins is then a polynomial of the number of tables in the query even when composite inners are allowed.

With the same feasibility criteria, the number increases to an exponential for star queries exemplified by the star query 40 in FIG. 3. A star query is formed when a table at the center is connected by binary predicates to each of the other surrounding tables as for completely connected query graphs.

The query 42 in FIG. 3 is an illustrative example of a star query having linear queries in each of the arms. Ono et al showed that the number of feasible joins for queries having N quantifiers is $(N^3-N)/6$ for linear queries and $(N-1)*2^{N-2}$ for star queries. From this, it is clear that any exhaustive enumeration algorithm becomes impractical for large star queries even though it may remain practical for linear queries larger than generally permitted in most relational database systems.

Figure 4:
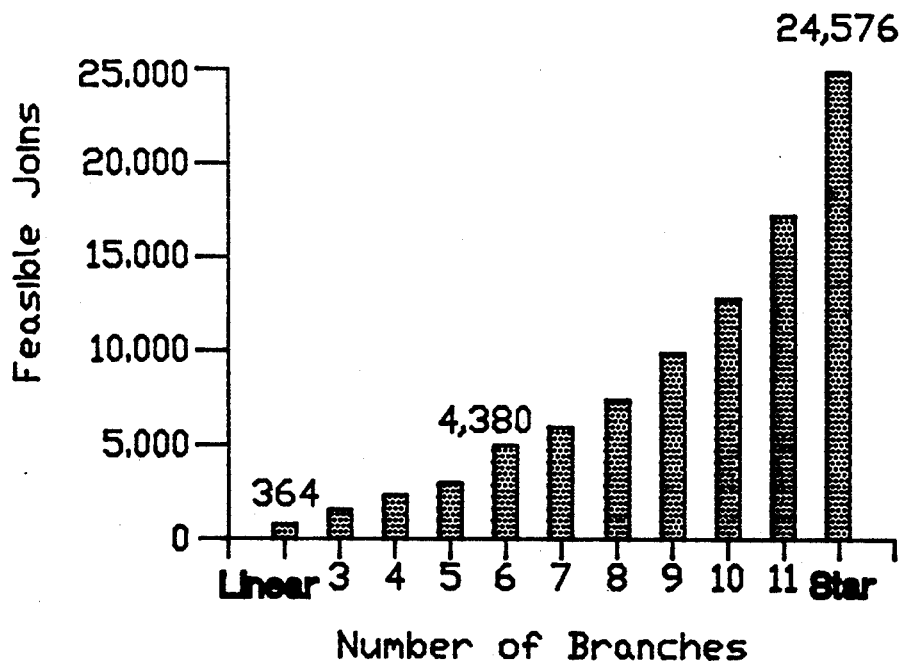
FIG. 4 illustrates the effect of query graphical shape on the number of feasible joins.

FIG. 4 shows the effect of query shape on the number of feasible joins as determined by Ono et al in the above cited references. The chart in FIG. 4 shows how fast the number of feasible joins increases as the shape of the query varies from linear to star for queries having a fixed 13 quantifiers and 12 binary predicates.

Figure 5:
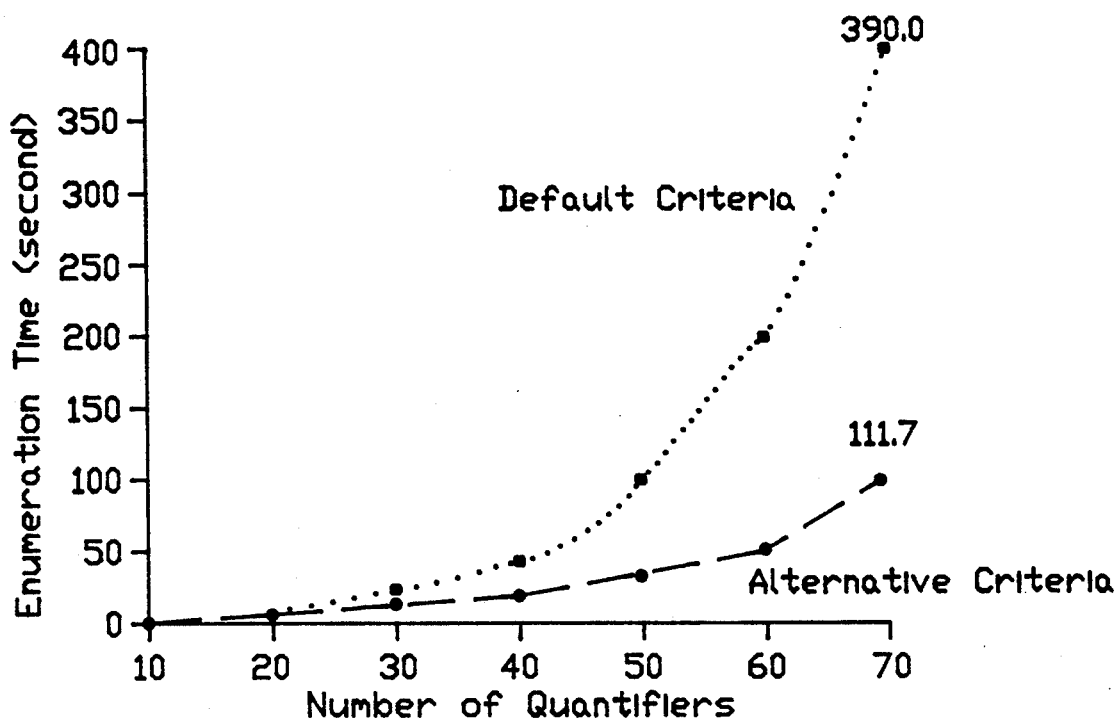
FIG. 5 illustrates the reduction of enumeration time by an alternative generation method for linear queries.
Figure 6:
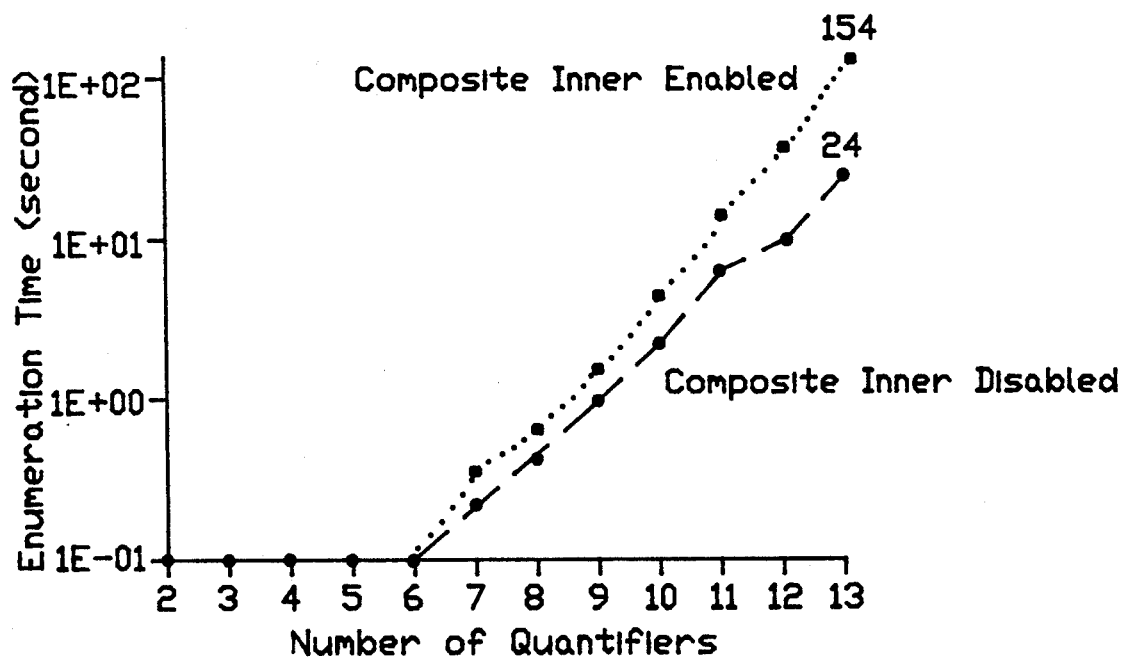
FIG. 6 illustrates the reduction of enumeration time by disabling composite inners for star queries.

The CPU time required to enumerate joins can be substantially reduced by reducing the number of potential joins coming from join generator 24 in FIG. 2. FIGS. 5-6 illustrate the effects of exploiting the adaptability of the enumeration algorithm by changing the join generation portion of the algorithm to reduce required CPU time. In both cases, the number of potential joins coming from join enumerator 24 was reduced without affecting the set of feasible joins. In the case shown in FIG. 5, where linear queries were optimized, the alternative Starburst generator discussed above was used. In the case for FIG. 6, where star queries were optimized, composite inners were disabled. Note that the time shown in FIGS. 5-6 is only the time required to enumerate feasible joins and does not include the time necessary to construct and evaluate the actual executable plans for the feasible joins FIGS. 5-6 illustrate the degree of internal cost reductions that can result from changing the search space criteria early in the plan generation process. The selection of the join generator criteria and the composite inner criterion must be made responsive to discovery of the query shape and cannot be automatically established for all queries.

Feasible joins can be enumerated for large queries that refer to many tables if the shape of the query is ar, which seems to be a common shape of frequently d queries. The join enumeration method adaptabil- important because it allows the number of feasible , to be balanced with the time required to generate n and also permits a reduction in the time necessary numerate feasible joins. There seems to be no single a enumeration method that works best for all queries ad certain queries benefit from minor variations within each enumeration method.

In the Ono et al references cited above, the adaptability mechanisms were controlled by a user at a terminal. For the first time, an automatic method is herein disclosed for exploiting these adaptability mechanisms to minimize the costs of optimizing a query execution plan.

The Adaptive Query Optimization Invention

The method of this invention for adapting predictive query optimization effort to expected execution time permits the query optimizer to make a trade-off automatically during optimization based upon the estimated cost of the best plan thus far. The Starburst optimizer is used to adjust the alternatives considered via compile-time feasibility parameters. These compile-time parameters adjust the search space of alternatives considered by enabling or disabling certain classes of alternative plans, such as Cartesian products and composite inners, that less frequently contain the optimal plan.

An initial phase of query optimization optimizes the query over a small set of alternatives by disabling all "optional" classes of alternatives, yielding an initial estimate of execution time for the best plan from that very limited set. A larger set of alternative plans are then evaluated only if the initial estimated execution time exceeds the expected time to evaluate that larger set of alternatives by some given threshold. The larger the estimated execution time of the best alternative plan evaluated thus far, the larger the set of alternatives that the optimizer considers by adjusting the compile-time parameters.

To make this decision, the optimizer must be able to estimate the time necessary to evaluate a given search space of alternative plans. Since evaluating one alternative plan requires a fairly consistent and measurable amount of time, the time to optimize any search space can be estimated as the product of the average time to evaluate one alternative multiplied by the number of alternatives in the search space. The number of alternatives to be evaluated in any set can be estimated based upon the complexity of the query, which is largely a function of the number of tables referenced and the "shape" of the query graph whose edges are formed by the query's predicates linking its tables, as discussed above in connection with FIG. 3

For example, if each plan requires an average of 10 ms to evaluate, a linear query for ten tables could be optimized in approximately 0.81 seconds if composite inners are excluded and about 1.65 seconds if they are allowed If the best plan among those excluding composite inners is estimated to require less than 1.65 seconds to execute, clearly there is little benefit in evaluating the larger search space of alternative plans including composite inners, unless the optimizer's estimates are grossly inaccurate.

In general, more alternatives are evaluated only if the initial estimate of the execution time exceeds the additional optimization time required to consider the alternative search space plus the execution time of the optimal plan found among the alternative search space. More specifically, if the estimated execution time $E_1$ of the optimal plan from search space $S_1$ can be improved by evaluating the larger search space $S_2$ requiring additional optimization time $O_2$, then it will be worthwhile to evaluate $S_2$ only if $E_1 > O_2 + E_2$. Unfortunately, there is no way to know in advance how much the optimal plan can be improved by considering a larger search space. However, if it is supposed that $E_1$ can improved by at least 10 percent, then $E_2 \leq 0.9*E_1$, so evaluating search space $S_2$ should be worthwhile if $E_1 > 10*O_2$. Typically, execution times far exceed optimization times so that additional optimization is generally warranted.

The preferred adaptive optimization procedure is presented in PASCAL-like pseudocode in FIG. 7, with the following symbol definitions

| | |
|---|---|
| Q = | the query to be optimized containing N tables |
| S = | the set of search spaces to be searched during optimization |
| P(i) = | the best plan found using search space i in S |
| P = | the best plan found to date in search spaces 0, 1, . . . i |
| C(i) = | the execution cost of P(i) estimated by the optimizer |
| C = | the execution cost of P estimated by the optimizer |
| N(i) = | the number of alternatives estimated within search space i according to the "shape" of the Q graph |
| A = | the average evaluation cost for a single alternative plan within S (depends on implementation) |
| T = | a minimum threshold representing the |

| | -continued |  |
|---|---|---|
| $\delta =$ | improvement in C required to justify considering another search space, expressed as a ratio of the new best cost to the old best cost $(0 < T < 1)$ a test margin parameter equal to $(1 + T)*C - A(i)$ *N(i) | 5 |

For a linearly-shaped graph such as 12-table graph 38 in FIG. 3, the following values for N(i) can be computed as:

| N(0) = | N(no composite inner, no Cartesian products) = $(N - 1)^2 = 121$ plans in search space (0) | |
|---|---|---|
| N(1) = | N(composite inner, no Cartesian products) = $(N^3 - N)/6 = 286$ plans in search space (1) | 15 |
| N(2) = | N(no composite inner, Cartesian products) = $N(2^{N-1}) - N(N + 1)/2 = 24,498$ plans in search space (2) | |
| N(3) = | N(composite inner, Cartesian products) = $(3^N - 2^{(N+1)} + 1)/2 = 261,625$ plans in search space (3) | 20 |

The above example for a 12-table linear query clearly illustrates a suitable method for generating a series of four successive search spaces, each expanded beyond the previous. Each space does not necessarily encompass the previous search spaces. The preferred automatic optimization effort adjustment procedure shown in FIGS. 7 and 8 proceeds from one such predetermined search space to next, halting the process as soon as the expected improvement and execution time is found to fall short of the requisite threshold of improvement over the estimated execution time of the best plan found so far. The search spaces are enlarged by replacing the feasible join criteria in the manner discussed above.

Figure 8:
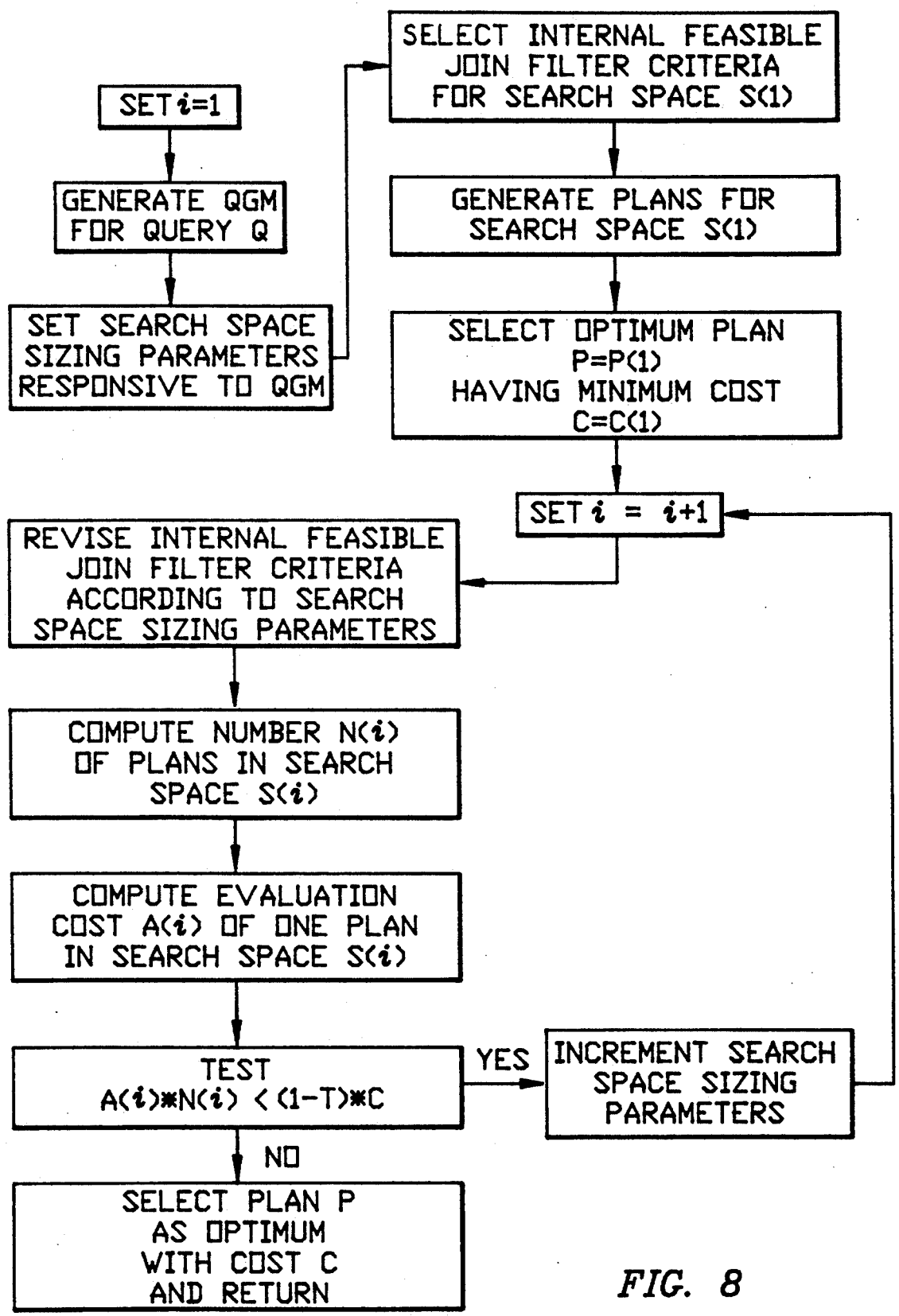
FIG. 8 provides a flow chart for the preferred method of FIG. 7.
Figure 9:
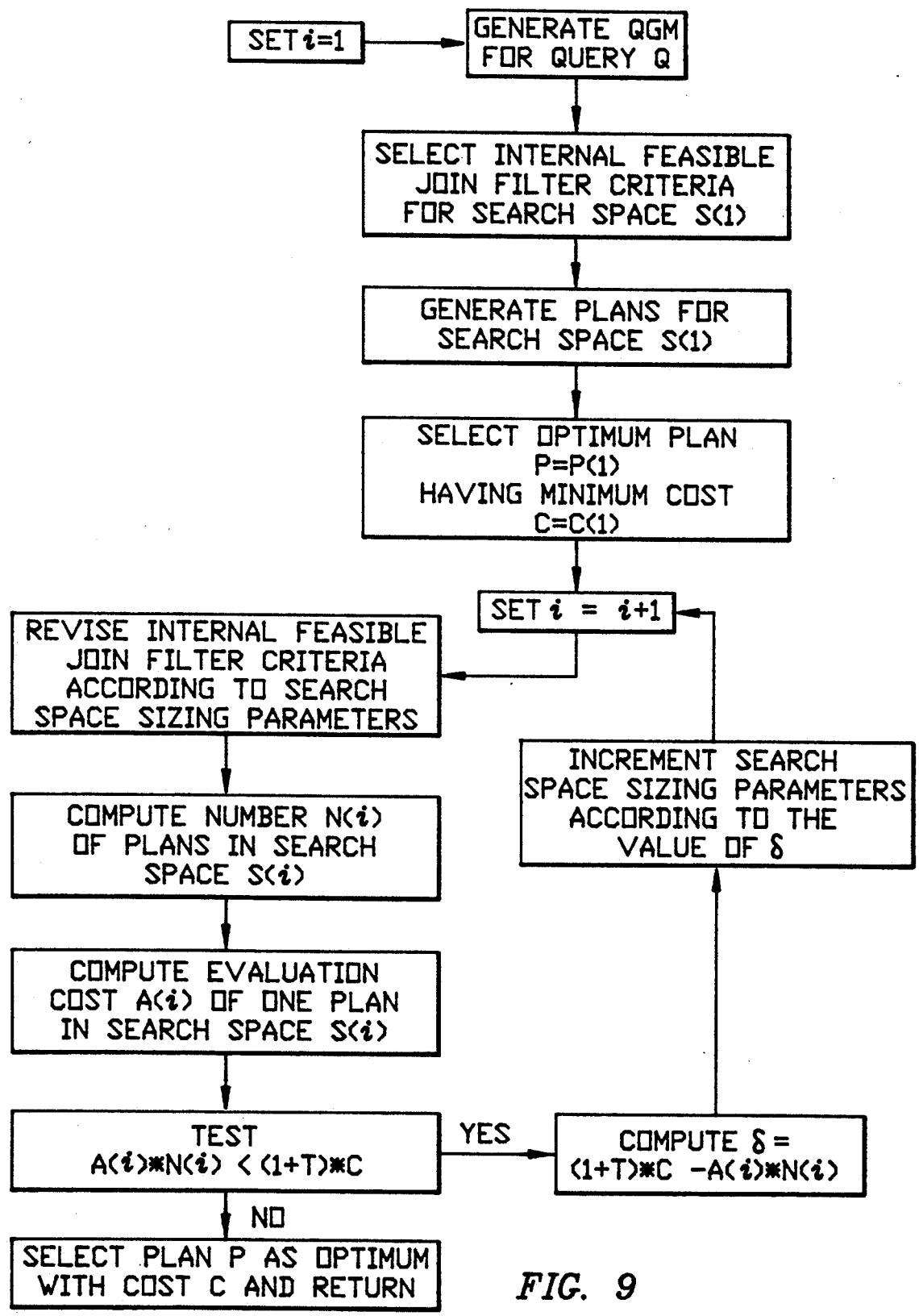
FIG. 9 provides a flow chart for an alternative method of this invention.

The method in FIGS. 7 and 8 does not increase search space size in response to the margin by which the improvement test is passed ($\delta$ in FIG. 9) but merely selects a new set of criteria from a predetermined list, halting when the improvement test fails. The alternative method shown in FIG. 9 evaluates the test margin, $\delta$, and reaches for a set of criteria in response to the size of $\delta$. Thus, a larger space may be immediately evaluated if warranted, without waiting to progress through a fixed sequence of search spaces.

Obviously, other embodiments and modifications of this invention will occur readily to those of ordinary skill in the art in view of these teachings. Therefore, this invention is to be limited only by the following claims, which include all such obvious embodiments and modifications when viewed in conjunction with the above specification and accompanying drawing.

We claim:

1. A method for selecting an optimum plan for query execution in a computer-implemented database system of the type wherein a user query for information is translated into a plurality of primitive database operations selected according to a plurality of database operator selection criteria to form an executable plan having an execution cost related to the selection of compile-time parameters and the execution sequence of said plurality of primitive database operations, said executable plan being within a search space having a plurality of plans defined by said compile-time parameters and said database operator selection criteria for said search space, said method comprising the steps of:

(a) defining a first search space according to a first set of compile-time parameters and a first set of database operator selection criteria;

(b) evaluating the execution cost of a first set of a plurality of plans in said first search space to identify said optimum plan having a first execution cost that is the minimum in said first search space;

(c) performing, for one or more other search spaces, the steps of (c.1) determining the evaluation cost of evaluating the execution costs of a plurality of plans in another search space, (c.2) if said evaluation cost is less than a predetermined fraction of said first execution cost, performing the steps of (c.2.1) evaluating the execution costs of said plurality of plans in said another search space, (c.2.2) identifying a new plan having a second execution cost that is the minimum in said another search space, and (c.2.3) replacing said optimum plan with said second plan only if said first execution cost is greater than said second execution cost.

2. The method of claim 1 wherein said determining step (c.1) comprises the steps of:

(c.1.1) measuring the cost of evaluating a first plan in said another space;

(c.1.2) estimating the number of plans in said another search space; and (c.1.3) computing the product of said number and said cost of evaluating said first plan.

3. The method of claim 1 wherein said first performing step (c) comprises the additional step of:

(c.0) defining another search space by selecting new compile-time parameters and new database operator selection criteria in accordance with the arithmetic difference of a predetermined fraction of said first execution cost less the actual cost of evaluating said execution cost of said plans in said first search space.

4. A method for selecting an optimum plan for query execution in a computer-implemented database system of the type wherein a user query for information is translated into a plurality of primitive database operations selected according to a plurality of database operator selection criteria to form an executable plan having an execution cost related to the selection of compile-time parameters and the execution sequence of said plurality of primitive database operations, said executable plan being within a search space having a plurality of plans defined by said compile-time parameters and said database operator selection criteria for said search space, said method comprising the steps of:

(a) defining a first search space according to a first set of compile-time parameters and a first set of database operator selection criteria;

(b) evaluating the execution cost of a first set of a plurality of plans in said first search space to identify said optimum plan having a first execution cost that is the minimum in said first search space;

(c) defining another search space by selecting new compile-time parameters and new database operator selection criteria in accordance with the arithmetic difference of a predetermined fraction of said first execution cost less the actual cost of evaluating said execution cost of said plans in said first search space;

(d) if said evaluation cost is less than a predetermined fraction of said first execution cost performing the steps of
  (d.1) evaluating the execution costs of said plurality of plans in said another search space,
  (d.2) identifying a new plan having a second execution cost that is the minimum in said another search space, and
  (d.3) replacing said optimum plan with said second plan only if said first execution cost is greater than said second execution cost.

5. The method of claim 1 wherein each said search space is limited to a plurality of two-way join sequences each being equivalent to said user query for information expressed as an N-way join query.

6. In a computer-implemented database system, a query optimizer comprising:
  plan generator means for defining a plurality of query execution plans over a first search space in accordance with common compile-time parameters and database operator selection criteria;
  plan evaluator means for calculating the execution cost of said query execution plans and for designating an optimum plan;
  search space evaluator means, for estimating the evaluation cost, of evaluating the execution costs of all in a second search space; and
  terminator means for halting the search for an optimum query execution plan responsive to the decline of a predetermined fraction of the optimum plan execution cost below the estimated cost for evaluating all plans in said second search space.

7. The query optimizer of claim 6 wherein said space evaluator means comprises:
  plan counter means for counting the number of query execution plans embraced by a search space; and evaluation cost means for measuring the evaluation cost of said query execution plans embraced by a search space.

* * * * *